(12) United States Patent
Wang et al.

(10) Patent No.: US 10,670,464 B2
(45) Date of Patent: Jun. 2, 2020

(54) METHOD OF COLLECTING RADIATION INFORMATION OF TURBINE BLADE

(71) Applicant: UNIVERSITY OF ELECTRONIC SCIENCE AND TECHNOLOGY OF CHINA, Chengdu (CN)

(72) Inventors: Chao Wang, Chengdu (CN); Ying Duan, Chengdu (CN); Jun Hu, Chengdu (CN); Zezhan Zhang, Chengdu (CN); Yang Yang, Chengdu (CN); Xueke Gou, Chengdu (CN); Fei Wang, Chengdu (CN); Jing Jiang, Chengdu (CN); Jinguang Lv, Chengdu (CN); Yueming Wang, Chengdu (CN); Hongchuan Jiang, Chengdu (CN); Li Du, Chengdu (CN); Jiexiong Ding, Chengdu (CN); Jingqiu Liang, Chengdu (CN); Xianfu Liu, Chengdu (CN); Xiaojiang Shi, Chengdu (CN); Bing Xiong, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 224 days.

(21) Appl. No.: 15/871,033

(22) Filed: Jan. 14, 2018

(65) Prior Publication Data
US 2019/0003893 A1 Jan. 3, 2019

(30) Foreign Application Priority Data
Jun. 30, 2017 (CN) .......................... 2017 1 0523299

(51) Int. Cl.
*G01K 1/00* (2006.01)
*G01J 5/00* (2006.01)
(Continued)

(52) U.S. Cl.
CPC ............ *G01J 5/0088* (2013.01); *F01D 17/02* (2013.01); *F01D 17/085* (2013.01);
(Continued)

(58) Field of Classification Search
USPC ......................... 374/141, 208, 120, 144, 129
See application file for complete search history.

(56) References Cited

U.S. PATENT DOCUMENTS

| | | | |
|---|---|---|---|
| 5,184,017 A * | 2/1993 | Tury .................... | G01N 21/274 250/252.1 |
| 5,475,223 A * | 12/1995 | Carter, III ........... | F02D 41/1451 250/339.06 |

(Continued)

*Primary Examiner* — Mirellys Jagan
(74) *Attorney, Agent, or Firm* — Matthias Scholl P.C.; Matthias Scholl

(57) ABSTRACT

A method of collecting radiation information of a turbine blade, the method including: 1) collecting a radiated light from the surface of the turbine blade, analyzing the radiated light using a spectrometer to calculate compositions and corresponding concentrations of combustion gas; 2) calculating an absorption coefficient of the combustion gas at different concentrations; 3) calculating a total absorption rate of the combustion gas at different radiation wavelengths under different concentrations of component gases; 4) obtaining a relationship between the radiation and a wavelength; 5) finding at least 3 bands with a least gas absorption rate; 6) calculating a distance between a wavelength of a strongest radiation point of the turbine blade and the center wavelength, and selecting three central wavelengths closest to the wavelength with the strongest radiation; and 7) acquiring radiation data of the turbine blade in the windows obtained in 6).

1 Claim, 4 Drawing Sheets

(51) Int. Cl.
*G01J 5/52* (2006.01)
*F01D 17/08* (2006.01)
*F01D 21/00* (2006.01)
*F01D 17/02* (2006.01)
*G01J 5/06* (2006.01)

(52) U.S. Cl.
CPC .......... *F01D 21/003* (2013.01); *G01J 5/0022* (2013.01); *G01J 5/52* (2013.01); *F05D 2270/303* (2013.01); *F05D 2270/804* (2013.01); *G01J 2005/0048* (2013.01); *G01J 2005/067* (2013.01)

(56) References Cited

U.S. PATENT DOCUMENTS

| | | | | |
|---|---|---|---|---|
| 5,489,777 A | * | 2/1996 | Stedman | G01J 5/602 250/338.5 |
| 6,001,064 A | * | 12/1999 | Weckstrom | G01N 11/00 422/84 |
| 8,424,292 B2 | * | 4/2013 | Hoyte | F01N 3/208 60/275 |
| 2012/0266653 A1 | * | 10/2012 | Yaniv | A61B 5/14551 73/23.3 |

* cited by examiner

METHOD OF COLLECTING RADIATION INFORMATION OF TURBINE BLADE

CROSS-REFERENCE TO RELATED APPLICATIONS

Pursuant to 35 U.S.C.§ 119 and the Paris Convention Treaty, this application claims foreign priority to Chinese Patent Application No. 201710523299.2 filed Jun. 30, 2017, the contents of which and any intervening amendments thereto are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, and Cambridge, Mass. 02142.

BACKGROUND OF THE INVENTION

Field of the Invention

The invention relates to a method of collecting radiation information of a turbine blade.

Description of the Related Art

Conventionally, to measure the temperature of turbine blades, a pyrometer probe is inserted into a through-hole drilled on the casing near the turbine blades. The probe is disposed above the blades, and the high temperature gas flows between the blades and the probe. Under such circumstances, the high temperature gas will absorb the radiation of the turbine blade. This adversely affects the measurement of radiation intensity of the turbine blade by the probe.

SUMMARY OF THE INVENTION

In view of the disadvantages or needs for improvement existing in the prior art, the disclosure provides an improved method of collecting radiation information of a turbine blade. By analyzing the combustion gas composition and concentration, the three most suitable radiation bands for temperature measurement are calculated accurately. Thus, the temperature measurement error is reduced by selecting bands to avoid the combustion gas absorption peaks.

The composition and concentration of each combustion gas is obtained by a spectrometer, and then the temperature measurement bands are selected step by step. The selection is based on the following two principles:

(1) The total absorption of the various gases within the temperature measurement band should be as low as possible, which means the radiation energy attenuation will be as small as possible when going through the high temperature gas;

(2) The blade radiation should be as large as possible to facilitate the information filtering and noise reduction.

At first, the total gas absorption rate can be calculated by formula after spectroscopic analysis. And then, the blade radiation changing with the wavelength is obtained according to Planck formula. Utilizing the two curves to avoid the combustion gas absorption section, three temperature measurement windows are acquired. Finally, the turbine blade temperature is calculated using the three bands.

To achieve the above object, in an aspect of the disclosure, there is provided a method of collecting radiation information of a turbine blade, the method comprising:

1) collecting a radiated light from a surface of the turbine blade, analyzing the radiated light using a spectrometer to calculate compositions and corresponding concentrations of combustion gas, and looking up an absorptivity N of the radiated light corresponding to wavelengths in an HITEMP spectral database;

2) calculating an absorption coefficient of the combustion gas at different concentrations according to the formula: a=K×ECL+b, wherein a is the absorption coefficient at a certain concentration of the combustion gas, K,b are constant factors, E is a relative cross-sectional area of the combustion gas which represents a light-sensitive area of the spectrometer, C is a concentration of the combustion gas, and L is an optical path length which represents a distance that the radiated light from the surface of the turbine blade propagates in the combustion gas;

3) calculating a total absorption rate of the combustion gas at different radiation wavelengths under different concentrations of component gases using the following formula:

$$A = \sum_i (a_i * N),$$

wherein $a_i$ represents an absorption coefficient of a component gas i, and i is a serial number of the component gas in the combustion gas;

4) obtaining a relationship between a radiation and a wavelength by using the formula:

$$M(\lambda, T) = \varepsilon \cdot \frac{C_1}{\lambda^5} \frac{1}{\exp\left(\frac{C_2}{\lambda T}\right) - 1},$$

wherein $M(\lambda,T)$ represents the radiation when the wavelength is $\lambda$ and a temperature is T, $\varepsilon$ is a radiation coefficient, and $C_1$, $C_2$ are first and second radiation constants; and drawing a curve illustrating a relationship between the total absorption rate obtained in 3), the radiation and the wavelength at the same coordinate system;

5) finding at least 3 bands with a least gas absorption rate according to the curve obtained in 4), and calculating a central wavelength of each band;

6) calculating a distance between a wavelength of a strongest radiation point of the turbine blade and the center wavelength obtained in 5), and selecting three central wavelengths closest to the wavelength with the strongest radiation; wherein the three center wavelengths corresponding to three bands are data acquisition windows of the turbine blade; and 7) acquiring radiation data of the turbine blade in the windows obtained in 6).

In a class of this embodiment, a wavelength $\lambda_s$ of the three bands obtained in 6) corresponding to a minimum absorption rate of the combustion gas is calculated, and a distance d between the wavelength $\lambda_s$ and a center wavelength of a corresponding band is calculated; and a band in the range of $\lambda_s \pm d$ in the three bands are determined as the acquisition windows.

The invention uses the spectrometer to analyze the composition and concentration of the combustion gas, and the total absorption rate of the combustion gas components is calculated. Then, the relationship between the radiation intensity of the turbine blade and the wavelength is calculated by Plank formula. According to the two curves above, the three bands which have strong turbine blade radiation and low gas absorption rate are selected. The three bands are considered to be the data acquisition windows of the turbine blade, which greatly improve the data acquisition accuracy of the turbine blade.

DETAILED DESCRIPTION OF THE EMBODIMENTS

Figure 1:
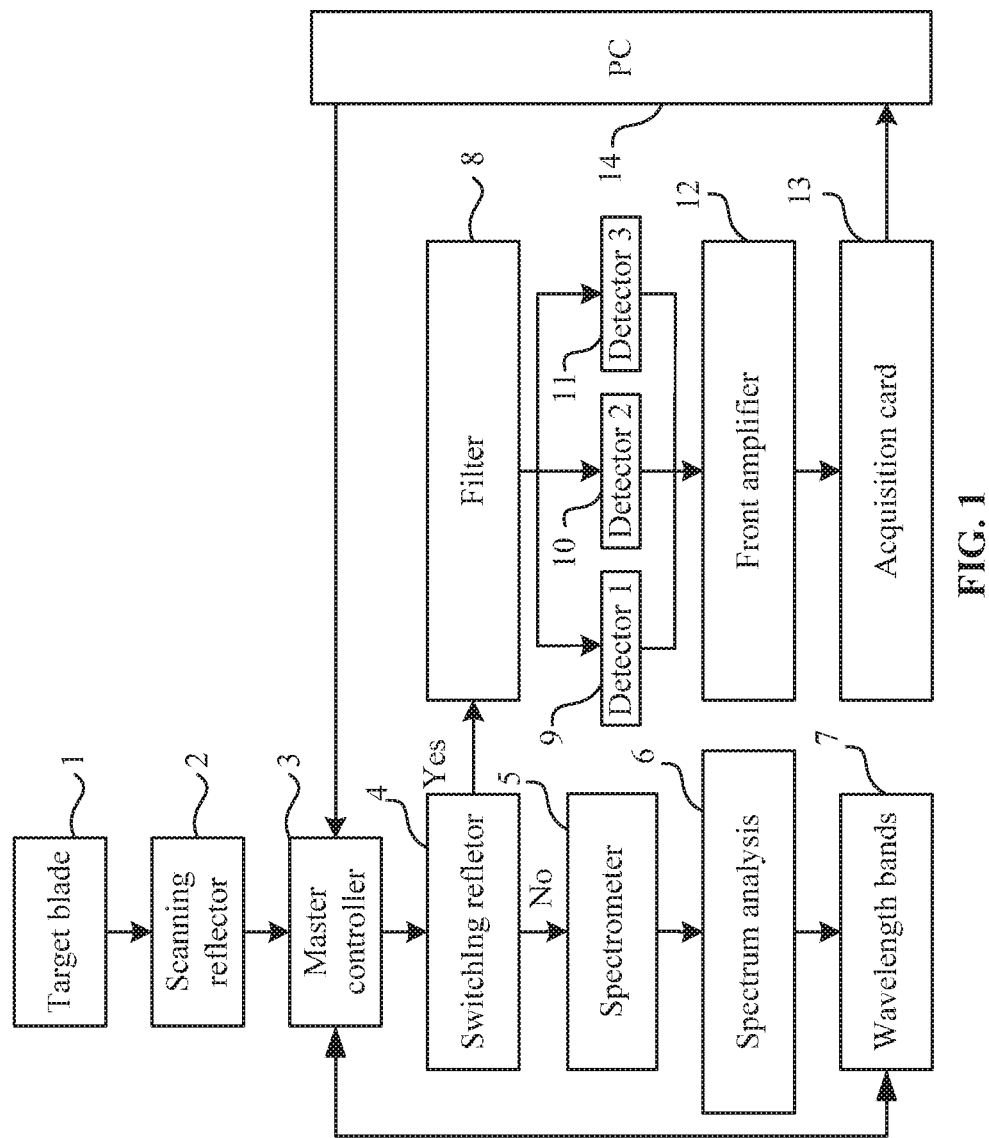
FIG. 1 is a connection of components for achieving a method of collecting radiation information of a turbine blade according to one embodiment of the disclosure.

FIG. 1 shows a connection of components for achieving a method of collecting radiation information of a turbine blade. The radiation of a target blade 1 enters the optical probe via the scanning reflector 2, passing through the combustion gas. The master controller 3 manages the switching reflector 4 to remain in place. As a result, the radiation received by the spectrometer 5 for spectrum analysis 6 to measure the composition and concentration of the combustion gas. Then, the master controller commands the filter wheel to select the wavelength bands 7, avoiding the absorption peaks, and controls the switching reflector to be removed. Radiation enters the filter 8 whose band selection is finished. The radiation is measured by the detectors 9, 10, 11 and converted into electricity signal. The front amplifier 12 amplify signals, and then transfer the collected data by an acquisition card 13 to the PC 14.

Figure 2:
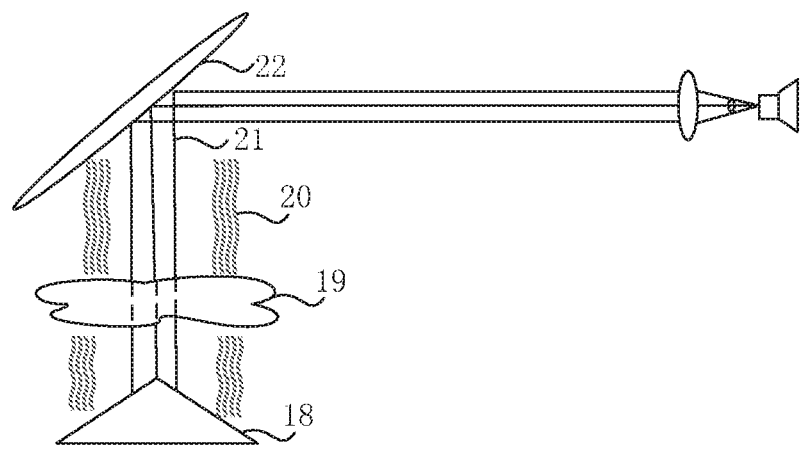
FIG. 2 illustrates an interaction of radiation of a turbine blade and high temperature gas prior to entering an optical probe.

FIG. 2 shows that the heat radiation 21 emitted from the turbine blade 18 is absorbed partially by the high temperature combustion gas 19, and then enters the optical probe by the scanning reflector 22 together with the combustion gas stream 20.

Figure 3:
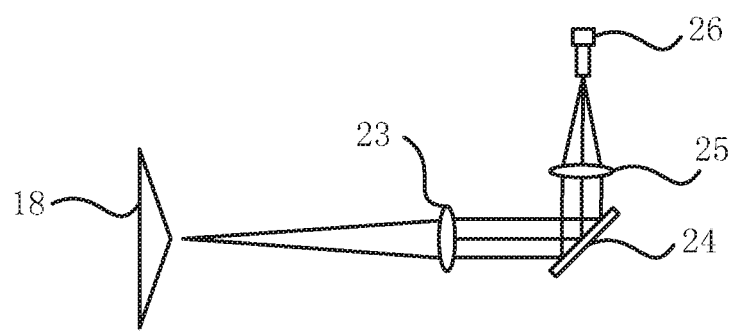
FIG. 3 shows the measurement of compositions and concentrations of combustion gas using a spectrometer according to one embodiment of the disclosure.

FIG. 3 shows that the blade radiation goes through a collimating mirror 23, a switching reflector 24 and a focus lens 25, and then enters into the fiber optic spectrometer 26. The spectrometer analyzes the composition and concentration of the combustion gas. Thereafter, the combustion gas absorption spectrum in the infrared band are obtained, then the infrared windows for temperature measurement are selected out. And the corresponding filter is switched by the control circuit.

The combustion gas analysis is as follows:

Combustion products include $H_2O$, $CO_2$, $N_2$, a small amount of CO, NO, $SO_2$, $O_2$, $H_2$ and so on. According to the infrared absorption theory of molecules, the infrared absorption of homo-nuclear diatomic molecules ($H_2$, $O_2$, $N_2$) can be ignored. Table 1 shows the center absorption infrared wavelength of the main compositions.

TABLE 1

| Gas composition | Infrared absorption band center wavelength/μm | | | | | | | | |
|---|---|---|---|---|---|---|---|---|---|
| $H_2O$ | 0.94 | 1.1 | 1.38 | 1.87 | 2.70 | 3.2 | 6.27 | | |
| $CO_2$ | 1.4 | 1.6 | 2.0 | 2.7 | 4.3 | 4.8 | 5.2 | 9.4 | 10.4 |
| CO | 2.3 | 4.7 | | | | | | | |
| NO | 2.6 | 4.5 | 5 | 5.5 | | | | | |
| $SO_2$ | 2.5 | 3.7 | 3.8 | 4 | 7.7 | 8.3 | 20 | 125 | |

Here, the calculation of the absorption coefficient with $H_2O$ as an example at 1 μm is illustrated. Look up the HITEMP database to obtain the absorbance rate of $H_2O$, $CO_2$, CO, NO, $SO_2$ at 1000 K. $N_{H_2O}$=0.89. The concentration of $H_2O$ measured by the spectrometer is 36%, the cross-sectional area and volume of the column are respectively 0.086, 3.12, and the constant factor is 0.16, 0.36, that is C=3.12, E=0.086, L=0.172, K=0.16, b=0.36. Substituting the equation a=K×ECL+b, the absorption coefficient is calculated to be 0.36074. Combined with the water absorption rate is 0.89, substituting it to the total absorption rate formula, the result is $$A = \sum_i (a_i * N), a_{H_2O} * N_{H_2O} = 0.36074 * 0.89 = 0.32.$$

Similarly, we can get the absorption of several other gases, add all of them to get the total absorption rate at 1 μm is A=0.55. Then, $C_1$=3.71418×10$^{-6}$ Wm$^2$, $C_2$ 1.4388×10$^{-2}$ mK, ε=1, λ=1 μm, T=1000 K, substituting them to the Planck equation $$M(\lambda, T) = \varepsilon \cdot \frac{C_1}{\lambda^5} \frac{1}{\exp\left(\frac{C_2}{\lambda T}\right) - 1},$$

the blade radiation got is $M_{\lambda=1 \mu m}$=2.09*10$^9$.

Figure 4:
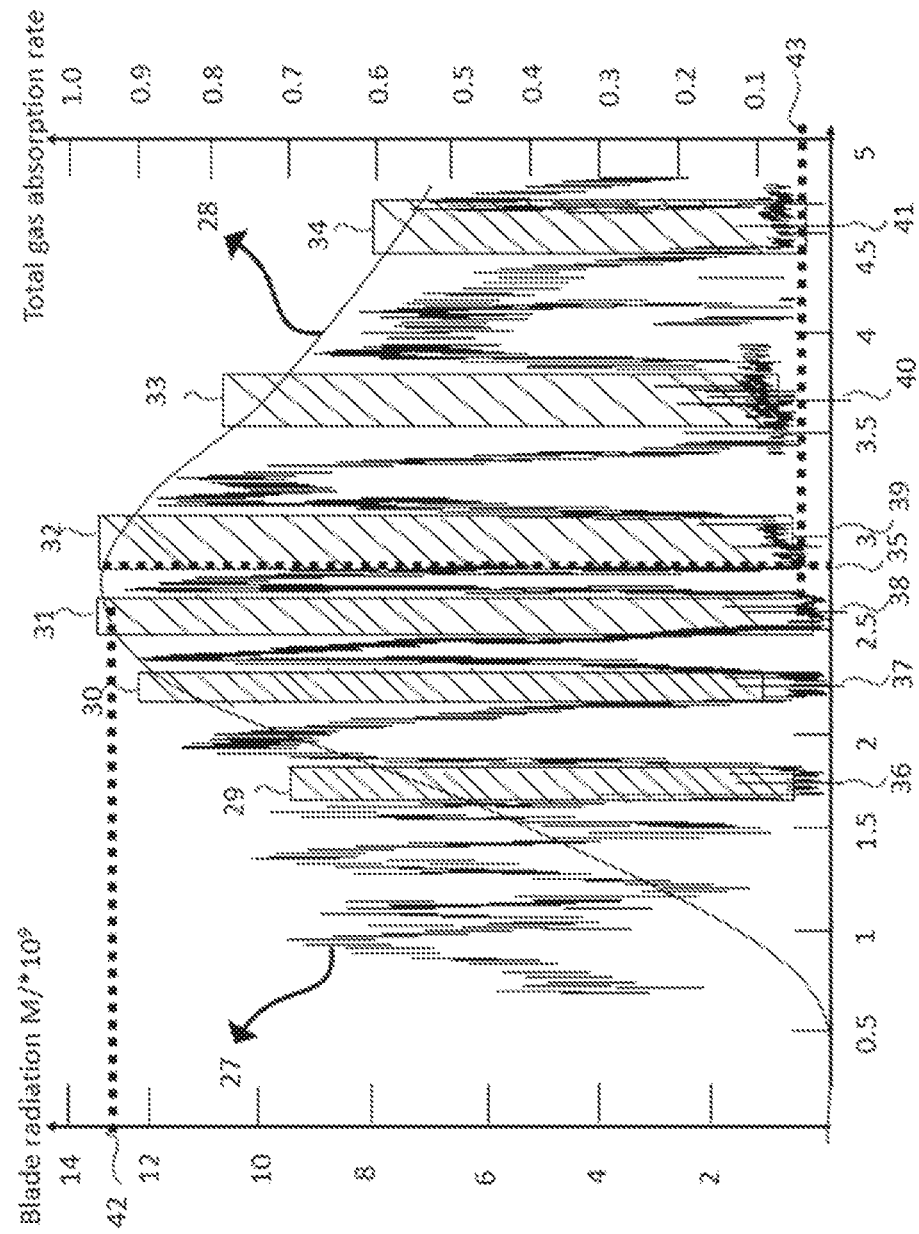
FIG. 4 shows a blade radiation spectrum and a total absorption spectrum of combustion gas at 0-5 μm and 1000 K.

Ultimately, the total absorption rate and blade radiation curve at detection range 0.4-5 μm can be obtained using the same method, as shown in FIG. 4.

The bands after removing the combustion gas absorption peaks avoid the impact of the combustion gas radiation on the blade temperature measurement, which contribute to improve the temperature measurement accuracy. The detector converts the received radiation signal into an electrical signal, and amplifies the signal through the front-end amplifier. Then, the signal processed by the above steps is used for data integration by the data acquisition card. Finally, the blade temperature is calculated by substituting the radiation formula from the PC.

Figure 5:
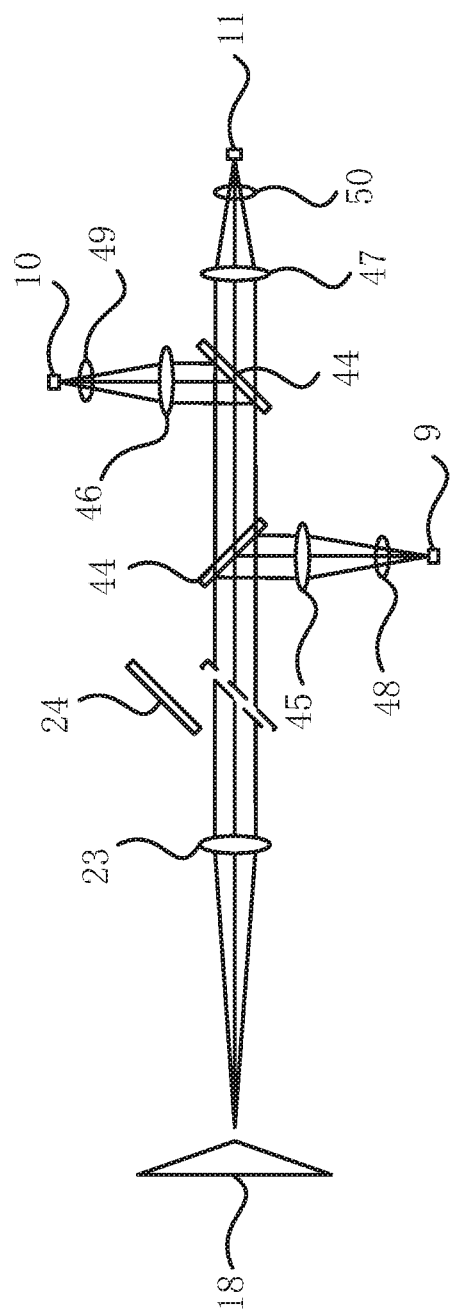
FIG. 5 shows an optical path for temperature measurement of a turbine blade according to one embodiment of the disclosure.

A curve showing the relationship between the total gas absorption rate 27 and the blade radiation 28 is shown at the same coordinate system by data processing software. As shown in FIG. 4, to obtain the maximum radiation energy of the blade, the bands near the radiant energy crest of the blade is selected, which correspond to the lower absorption rate (rectangular area in the figure). Then, the gas absorption peaks are avoided and the temperature measurement bands are acquired according to the following principles: (1) the total absorption rate is as low as possible; (2) the blade radiation is as large as possible. Because high-temperature gas also emit radiation, and sometimes even the radiation emitted by the combustion gas is more than the blade radiation, it is difficult for the detector to distinguish the real blade radiation. So we need to try finding bands to improve the detection resolution, where there is a large amount of blade radiation and the combustion gas absorption rate is very small at the same time. Referring to FIG. 4, several bands 29, 30, 31, 32, 33, 34 with lower absorptivity are selected first, 1.7-1.8 μm, 2.2-2.3 μm, 2.5-2.7 μm, 2.9-3.1 μm, 3.5-3.8 μm, 4.4-4.7 μm, then the wavelength 35 when the radiation is largest is calculated according to Wien's theory, λ=2.9 μm. The distance between the wavelength 35 of the strongest point of the blade radiation and center wavelength bands (36, 37, 38, 39, 40, 41) with lower absorptivity is calculated, then select the three central wavelengths with low absorptivity closest to the wavelength with the strongest radiation. The center wavelength $\lambda_s$ corresponding to the three selected bands 37, 38, 39 are 2.25 μm, 2.6 μm, 3.0 μm. The bands corresponding to the minimum value of the total gas absorption rate are 2.2 μm, 2.5 μm. 2.9 μm. The distance d between the wavelength and the center wavelength of the three corresponding band are 0.05 μm, 0.1 μm, 0.1 μm. Finally, $\lambda_s \pm d$, that is 2.25±0.5 μm, 2.6±0.1 μm, 2.9±0.1 μm, are the data acquisition windows of the turbine blade. The master controller commands to move the switching reflector out, the selected three bands are transmitted to the filter wheel for band selection. As shown in FIG. 5, the radiation passes through the dichroic mirrors 44, the focus lens 45, 46, 47, and the filters 48, 49, 50, and then is collected by the detectors 9, 10, 11.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method of collecting radiation information of a turbine blade, wherein the turbine blade is rotated due to the expansion of a combustion gas and the turbine blade is heated to a temperature by the combustion gas, the method comprising:
   1) collecting light radiated from a surface of the turbine blade, analyzing the light radiated from the surface of the turbine blade using a spectrometer and determining gas components of the combustion gas and respective concentrations of the gas components, and looking up absorptivities N of the gas components at various wavelengths within a wavelength range in an HITEMP spectral database;
   2) calculating an absorption coefficient of the gas components at the respective concentrations of the gas components according to the formula: a=K×ECL+b, wherein a is the absorption coefficient at the concentration of a gas component, K,b are constant factors, E is a relative cross-sectional area of the combustion gas which represents a light-sensitive area of the spectrometer, C is the concentration of the gas component, and L is an optical path length which represents a distance that the light radiated from the surface of the turbine blade propagates in the combustion gas;
   3) calculating a total absorption rate of the combustion gas at the various wavelengths under the respective concentrations of the gas components using the following $$A = \sum_i (a_i * N_i),$$

$A=\Sigma_i(a_i*N)$, formula wherein $a_i$ represents an absorption coefficient of an $i^{th}$ gas component, $N_i$ represents an absorptivity of the $i^{th}$ gas component, and i is a serial number of a gas component;
   4) calculating a radiance of the light radiated from the surface of the turbine blade at the various wavelengths using the formula:

$$M(\lambda, T) = \varepsilon \cdot \frac{C_1}{\lambda^5} \frac{1}{\exp\left(\frac{C_2}{\lambda T}\right) - 1},$$

wherein $M(\lambda,T)$ represents the radiance when a wavelength is λ and the temperature is T, ε is a radiation coefficient, and $C_1$, $C_2$ are first and second radiation constants; and drawing a curve illustrating a relationship between the total absorption rate obtained in 3), the radiance and the wavelength at a coordinate system;
   5) selecting at least 3 bands that comprise smallest total absorption rates with respect to other bands within the wavelength range from the curve obtained in 4), and calculating a center wavelength of each band;
   6) calculating an absolute difference between a strongest-radiance wavelength and each center wavelength obtained in 5), and selecting a first center wavelength that has the smallest absolute difference with respect to other center wavelengths, a second center wavelength that has the second smallest absolute difference with respect to other center wavelengths, and a third center wavelength that has the third smallest absolute difference with respect to other center wavelengths; wherein a first band comprising the first center wavelength, a second band comprising the second center wavelength, and a third band comprising the third center wavelength are data acquisition windows of the turbine blade; and the turbine blade has a strongest radiance at the strongest-radiance wavelength within the wavelength range; and
   7) acquiring radiation data of the turbine blade in the windows obtained in 6).

* * * * *